Dec. 10, 1946.      E. L. SCHNOEBELEN      2,412,473
DYNAMIC AND STATIC BALANCING MACHINE
Filed May 14, 1940      2 Sheets-Sheet 1
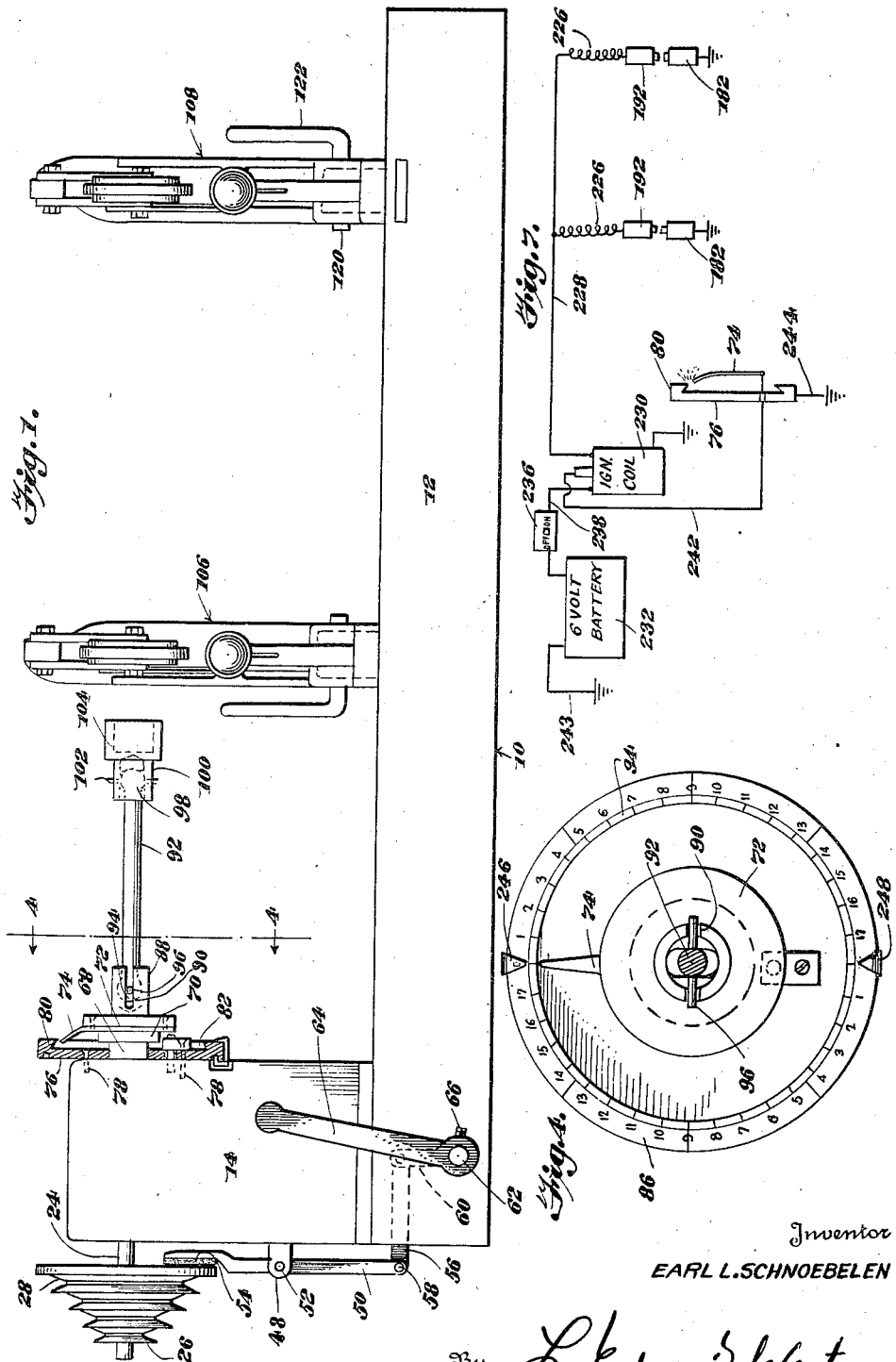
Inventor
EARL L. SCHNOEBELEN

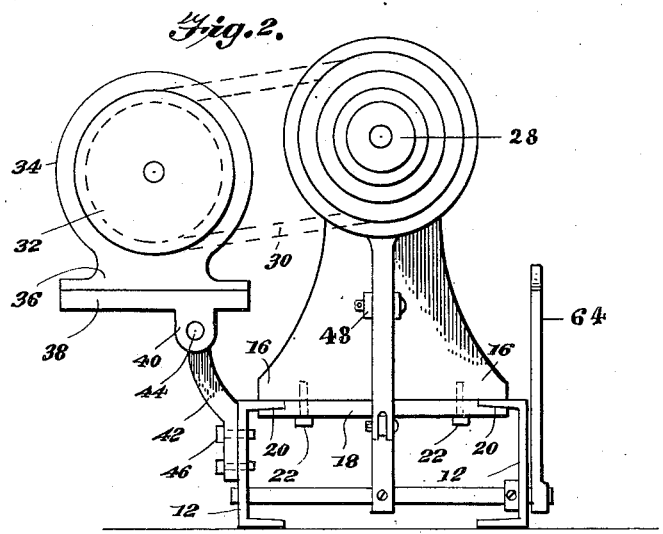
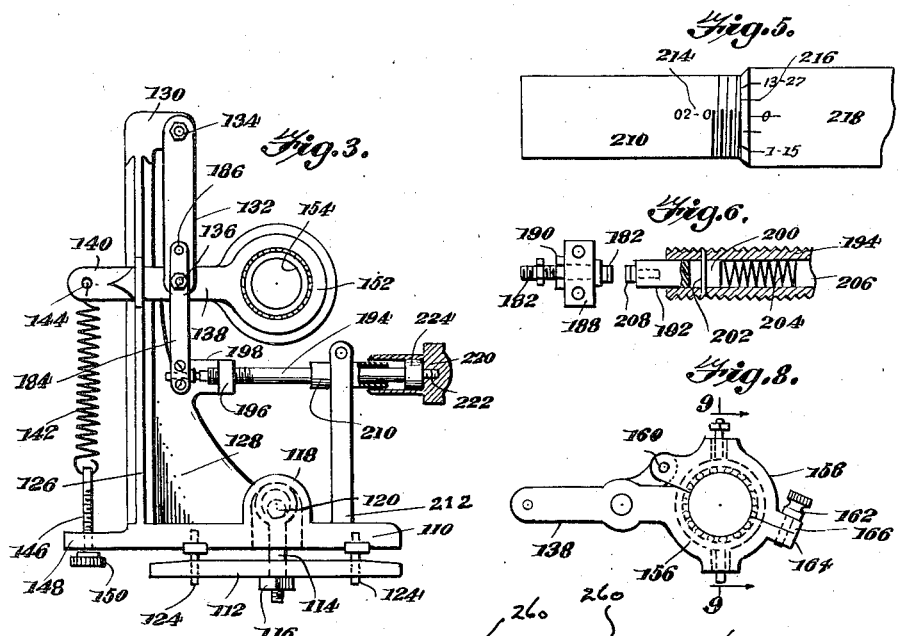
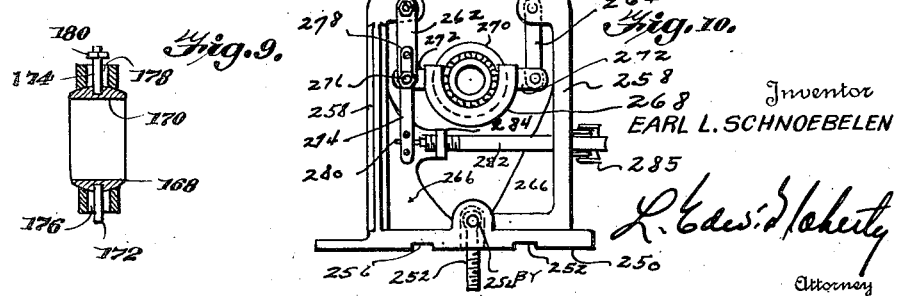

Patented Dec. 10, 1946

2,412,473

UNITED STATES PATENT OFFICE 2,412,473

DYNAMIC AND STATIC BALANCING MACHINE

Earl L. Schnoebelen, Rock Island, Ill.

Application May 14, 1940, Serial No. 335,167

1 Claim. (Cl. 73—66)

This invention relates to static and dynamic balance machines.

The primary object of this invention is to provide a machine for accurately determining the static and dynamic balance of rotating bodies such as crankshafts, armature shafts, drive shafts and any rotating member where static and dynamic balance is a determining factor of the smoothness of operation in the machine in which the rotating body is used.

A further object of this invention is to provide a machine of the above mentioned character in which the supports for the rotating body are suspended and are capable of an oscillatory movement which movement when caused by an unbalanced rotating body, may be determined and the exact location of the unbalanced portion of the rotating body is easily indicated upon a synchronous indicator.

A still further object of this invention is to provide a machine for determining the location of off center of a rotating body and simultaneously indicate in fractions of an inch the amount of off center or dynamic unbalance so that the rotating body can be corrected to compensate for the amount of off balance.

A still further object of this invention is to provide a machine of the above mentioned character in which an electric indicating means is employed for determining the location of the dynamic unbalance in a rotating body by causing a visible spark indication to occur on a position meter corresponding to the position of the rotating body supports as a result of unbalance in the rotating body.

A still further object of this invention is to provide a combined dynamic and static balance machine in which the supporting members for the work to be tested are capable of adjustment to the testing of rotating bodies of various dimensions.

Other objects and advantages of the invention will become apparent during the course of the following description taken with the accompanying drawings, wherein:

Figure 1 is a longitudinal side elevational view of the dynamic-static balance machine;

Figure 2 is an end elevational view illustrating the drive means for causing rotation of the work being tested at predetermined speeds;

Figure 3 is an end elevational view of the opposite end of the machine illustrating one of the rotating body supports;

Figure 4 is a vertical cross sectional view taken on lines 4—4 of Figure 1 looking in the direction of the arrows, showing the indicating means for determining the location of unbalance in a piece of work being tested;

Figure 5 is an enlarged fragmentary view of the micrometer adjustment for the visible signal indicating device contacts;

Figure 6 is a fragmentary view, partly in section, illustrating an adjustable contact for one of the rotating body supports;

Figure 7 is a diagrammatic view of the circuit wiring for the balance machine, showing the manner in which the unbalance position determining indicator is connected with the contact devices;

Figure 8 is a side elevational view of one of the rotating body supports, illustrating the bearing member therefor;

Figure 9 is a vertical cross sectional view taken on lines 9—9 of Figure 8 looking in the direction of the arrows, illustrating the structural details of the bearing member for supporting the work being tested, and Figure 10 is an end elevational view of a modified work support which may be used in lieu of the work support in Figures 1 to 9 inclusive.

In the drawings, wherein for the purpose of illustrating the invention and wherein like reference characters will be employed to designate like parts throughout the same, the reference character 10 will be employed to generally designate a machine base, formed from a pair of parallel U-shaped angle irons 12 extending the entire length of the machine.

The side parallel frame bars 12 are connected at one end by means of a vertical shaft support 14, having an outwardly flared base portion 16 adapted to rest on the upper edges of the angle bars 12. Secured to the underside of the vertical shaft support is a plate 18, having the edges chambered as at 20 for receiving the inturned edges of the angle bars 12. Bolts 22 extend through the plate 18 and have their threaded ends anchored in the base of the vertical shaft support 14.

Rotatably mounted in the upper portion of the vertical shaft support 14 is a rotary shaft 24, on one end of which is provided a pulley collar 26 having a series of V-shaped grooves 28 for receiving a drive belt 30, trained over a pulley 32 mounted on the armature shaft of an electric motor 34, the base of which as at 36, is secured to a table 38, having a boss 40 pivotally attached to a bracket arm 42 as at 44 anchored to one of the parallel side frame members 12 by means of bolts 46.

Extending from the end wall of the vertical shaft support 14 are a pair of ears 48 between which is pivoted a lever 50 as at 52 and mounted on one end of the lever 50 is a brake shoe 54 adapted to engage the pulley collar 26 and retard the rotation of the shaft 24. The opposite end of the lever 50 is connected to a link 56 by means of a pin 58 and said link 56 is connected to an arm 60 located on a stub shaft 62 journaled in one of the parallel side frame bars 12. A hand lever 64 is also attached to the stub shaft 62 and is locked thereon by a set screw 66.

The opposite end of the shaft 24 extends beyond the other face of the shaft support 14, as at 68, and is provided with an enlarged collar 70 to which is fastened a disk 72 having a pointer 74 forming one electrode of a spark gap which will be hereinafter more fully described. Cooperating with the electrode pointer 74 is a graduated disk 76 fastened to the vertical shaft support by means of screws 78. The disk 76 is provided with an annular flange 80, undercut at 82 and graduated on its radial face with scale markings 84 and 86, dividing the graduations into two sets on the right and left of a vertical diametrical center.

A socket coupling extension 88 is provided on the shaft extension 68 and is slotted as at 90 for receiving one end of coupling rod 92 having a spherical end 94 provided with a transverse pin 96 operating in the coupling socket slots 90.

The opposite end of the coupling rod 92 is also spherically formed, as at 98, and is received in a coupling socket 100, also slotted for receiving the pin 102 carried by the spherical end member 98. The work to be tested is received in a socket 104 formed on the end of the socket coupling member 100.

The rotating body to be tested is rotatably supported in suspended bearings 106 and 108 which are adjustably movable longitudinally with respect to the side frame angle bars 12 and since the suspended bearings are identical in construction, only one will be described in detail.

Each of the bearing supports includes a frame base portion 110 adapted to have its ends rest on the upper flanges of the parallel frame bars 12 and said base is adjustably held in position by means of a clamping plate 112, the free ends of which are adapted to engage under the upper flanges of the side frame bars 12. A clamping bolt 114 is carried by the base 110 and extends downwardly through the clamping plate 112 and is provided, on its threaded end, with a retaining nut 116. The opposite end of the clamping bolt extends into a housing 118 formed in the frame base 110 and is provided with an eye for receiving an eccentric shaft 120 journaled in the housing 118 and provided with a handle 122 for rotating the shaft and causing the clamping plate 112 to be drawn upwardly so that the ends will clamp the upper inturned flanges of the side frame members 12. Guide pins 124 are carried by the frame base 110 and extend through suitable openings in the clamping plate 112.

Extending upwardly from the frame base plate 110 is a bracket arm 126 braced by means of a tapered web 128, connecting the frame base and bracket arm and formed on the extreme upper end of the bracket arm 126 is a lateral extension 130. Freely suspended from the lateral extension 130, to swing transversely of the balanced machine, is a link 132, pivoted as at 134, and having pivoted to its lower end as at 136, a horizontal beam 138, one end of which projects in close proximity to the vertical bracket arm 126 as at 140 and is held in a horizontal position by means of a coil spring 142 attached as at 144, while the opposite end is connected to an adjustable screw 146 threaded in a projection 148 of the frame base 110. A knurled thumb piece 150 is formed on the adjustable screw to facilitate the placing of proper tension on the coil spring 142.

Formed on the opposite end of the pivoted beam 138 is a rotating body support 152 having a bearing 154 held in place and adapted to form a bearing for the work being tested. As shown in Figure 8, the pivoted beam is provided on its outer end with a split bearing member including semi-circular sections 156 and 158 and the section 156 is formed as an integral part of the pivoted beam 138 while the semi-circular section 158 is hinged thereto as at 160 and the free swinging end is clamped by means of a fastening screw 162, extending through ears 164 and 166, carried by the semi-circular members 156 and 158, respectively.

Universally mounted bearing inserts 168 and 170 are mounted in the semi-circular bearing members 156 and 158, respectively and each bearing insert is provided with a centering pin 172 and 174, extending into slots 176 and 178 therein. The centering pin 174 is provided with a flange 180 to prevent the insert 170 from being displaced.

A movable contact 182 is adjustably carried by each pivoted beam suspension arm 132 and said movable contact is threaded in the lower end of an extension 184 thereof, fastened in place by the pivot bolt 136 and an anchoring pin 186. As shown in Figure 6, the movable contact 182 is slidably mounted in a plate 188 and is set in an adjusted position by means of adjusting nuts 190, threaded thereon.

Adjacent to the movable contact 182 is one end of a hollow screw threaded rod 194, which is threaded in a lug 196 of an extension 198 formed integral with the brace web 128. The adjustable contact 192 is reciprocably mounted in the hollow screw threaded shaft 194 and is provided with a slot 200 in one end thereof, through which passes an anchoring pin 202, the ends of which extend into openings formed in the hollow rod.

A coil spring 204 has one end abutting the adjustable contact member 192 while the opposite end abuts against a plug 206 mounted in the hollow rod. Located in the adjustable contact member 192 is a plug 208 adapted to contact with the movable contact 182 when the bearing support 152 is vibrated.

The degree of adjustment applied to the hollow screw threaded rod may be determined by means of a graduated sleeve 210 clamped on the upper end of the vertical bar 212 which is attached to the adjustable base 110 by any suitable means. Graduations 214 are marked on the sleeve 210 which align with a series of graduations 216 marked on a movable sleeve 218 carried on the free end of the hollow screw threaded rod 194. A knurled thumb piece 220 is attached to the reduced screw threaded portion 222 of the hollow rod 194 and an annular boss 224 is formed thereon for limiting the threaded movement of the knurled thumb piece.

Each of the movable contacts 182 are grounded electrically as shown in Figure 7 while the adjustable contacts 192 are connected by lead wires 226 with a live wire 228 to one side of a high voltage transformer 230. The opposite terminal of the transformer is connected to a source of current such as a battery 232 having one pole grounded as at 243. A contact switch 236 is interposed in the lead line 238 between the source of current and the transformer 230 and a lead wire 242 connects the secondary winding of the transformer to the rotating pointer 74.

A circuit is completed through the gap formed by the rotating pointer 74, and the disk 76 by a ground connection 244.

For a consideration of the operation of the balancing machine, it will be supposed that a piece of work to be tested is placed in the bearing supports 152 and is connected to the coupling socket 104. The motor 34 is then started simultaneously with the closing of the switch 236. The starting of the motor will cause the shaft or rod being tested to be rotated at the desired rate of speed and should said rotating body be unbalanced, the movable contact members 182 will be vibrated, causing the same to move into engagement with the adjustable contact members 192, whereupon a circuit will be completed through the ignition or transformer coil 230, producing in turn a spark between the rotating pointer 74 and the undercut edge of the flange 80. The vibration of the rotating body will cause a spark to occur on the graduated portion of the disk 76 in the same diametrical location as the occurring vibration.

If the rotating body is dynamically unbalanced, sparks will jump from the pointer 74 to diametrically opposite points on the disk 76 and the occurrence of said sparks may be indicated by movable pointers 246 and 248, movable over the opposite graduated portions of the disk as at 86 and 84, respectively.

If the spark from the closing of both sets of contacts 182 and 192 occur in the same location on the disk 76, the rotating body is statically unbalanced and correction can be made in accordance with the respective location on the dial 84 or 86.

In the event that the rotating body being tested is both dynamically and statically unbalanced, correction can be made by noting the occurrence of the sparks on the dials 84 and 86 and when crankshafts are tested, any number of suspended supports 106 and 108 may be used.

Restated, it may be said that the body being balanced is driven through the flexible drive shaft 92, which is connected to the insulated motor 14. When vibration occurs in the body (due to unbalance) the contacts 182, 192 make and break contact in synchronization with these vibrations, causing a spark to jump off the rotor pointer 74 to the numbered ground ring 80, thereby showing the angular portion of unbalance on each end of the body, each end being tested separately. The amount of unbalance is shown on the graduated sleeve, Figure 5, which is connected to the breaker points 182, 208 (see Figure 6). The hollow rod 194 is unscrewed or backed off at the start of the balancing operation. From this outward position, it is screwed in until the points just contact. When the contacts are thus positioned the spark will jump from the rotor pointer 74, then the amplitude of unbalance is shown on the sleeve, Figure 5, for this end of the body. Then this sleeve is backed off and the same procedure is followed on the other side or end of the body. Thus the angular position of unbalance and the amount of unbalance for each end of the body can be ascertained. The greater the vibration, the less the sleeve is turned so the points meet, therefore the sleeve reading will be greater.

Usually two corrective planes are selected to remove or add weight to bring the body in balance. The amount is represented by each sleeve on each end or side of the body. However, when a body is out of balance excessively on one end, a small amount of vibration will vary through to the other end. In actual practice, when this occurs, the end which shows the excessive amount is corrected for balance, otherwise the amount shown on each end is corrected according to the sleeve reading.

If the location of unbalance were in the center of the body, both ends would vibrate the same amount and show the same angular position of unbalance. Corrections would be made on each end, if there were no provisions for making corrections in the center, provided the body was structurally strong enough to withstand any distortions. Otherwise corrections would be made in the center of the body.

In regard to sparks showing the amount of unbalance, in actual practice it has always been found that minute amounts of vibration present in the foundation or in the base of the balance machine, as small as .0001, would vibrate the points when brought together, provided the body is in perfect balance (otherwise the balance would separate these points), and that these vibrations are so rapid, due to the high frequency of the base that almost a pattern of sparks is given off the rotor pointer 74, when the body is in perfect balance. This feature is accepted and desired by many users of this balance machine, who require a very accurate balance on small high speed bodies. If the sparking character covered half the ground ring 80, this would indicate a certain degree of unbalance. The angular portion of unbalance would be in the center of this spark character.

In the modified form of the invention shown in Figure 10, there is provided a rotating body support, one of which will be provided for each end of the work, there being one shown for the purpose of illustration. A base portion 250 which corresponds to the base 110 in Figures 1 to 9 inclusive may be secured to the table by means of a bolt 250 pivoted to the base in an opening thereof as at 254. Openings 256 are provided in the underface of the base 250 for receiving guide pins similar to the ones shown in the preferred form of the invention as at 124.

Extending upwardly from the base 250 in parallel relation are supporting arms 258 having inwardly turned end portions 260 from which are suspended pivot arms 262 and 264. Reinforcing web plates 266 extend between the base and the upright arms 258 to prevent lateral movement of the arms and provide a rigid construction.

Extending between the lower ends of the suspended links 262 and 264 is a work supporting cradle 268 having a ball bearing mounting 270 and being provided at its ends with wing extensions 272 for pivotal connection with the suspending links 262 and 264.

Adjustably secured to the lower end of the suspended link 262 is a contact arm 274 held in place by the nut and bolt connection 276 and an additional machine screw 278. The lower end of the contact arm 274 is provided with a contact 280 which is adapted to be moved toward and away from the adjustable contact 282. Formed on the reinforcing web 266 is a threaded extension 284 which receives the adjustable contact shaft 282 which is provided with a micrometer adjustment 285 similar to the adjustment 220 shown in Figure 3.

The work may be positioned within the inner race member of the bearing member 270 and rotated by a chuck similar to the chuck structure 14 or 104 shown in Figure 1. The operation of the modified construction is identical to that as shown in the form of the invention described in Figures 1 to 9 inclusive.

It is to be understood that the form of the invention herewith shown and described is to be taken as a preferred embodiment of the same and that various changes in the shape, size and arrangement of parts may be resorted to without departing from the spirit of the invention or the scope of the subjoined claim.

I claim as my invention:

A machine for determining the dynamic balance of a body in rotation which comprises a base, supports carried by said base, means for rotatably supporting a body which comprises a pair of cradles, a pair of rigid links pivotally connected to each cradle, said links being pivotally connected to said supports to form a swingable carriage for said body, means for rotating said body, a pair of electrical contacts, one mounted upon each of said swingable carriages, a pair of stationary cooperating electrical contacts respectively, juxtaposed with respect to said first-mentioned contacts, a low tension electrical circuit connected to said contacts whereby vibratory movement of said carriage makes and breaks said low tension circuit, a high tension electrical circuit controlled by the rate of change of current in said low tension circuit, a synchronous indicating means rotatable substantially coaxially with said body, said high tension circuit being connected through said indicating means whereby breaking of the low tension circuit produces a visual indication on said indicating means, and means for adjusting said stationary contacts to cause a pair of said contacts to complete the primary circuit only when said cradles vibrate at their maximum amplitude.

EARL L. SCHNOEBELEN.